United States Patent [19]

Ebzery et al.

[11] Patent Number: 5,038,059
[45] Date of Patent: Aug. 6, 1991

[54] STATUS REGISTER WITH ASYNCHRONOUS SET AND RESET SIGNALS

[75] Inventors: Thomas Ebzery, Andover, Mass.; Timothy J. Powers, Carrollton, Tex.; Joseph A. Thomsen, Chandler, Ariz.

[73] Assignee: VLSI Technology, Inc., San Jose, Calif.

[21] Appl. No.: 482,103

[22] Filed: Feb. 20, 1990

[51] Int. Cl.⁵ ............................................. H03K 5/26
[52] U.S. Cl. .................................... 307/518; 307/514; 328/109; 340/825.51
[58] Field of Search ............... 307/511, 514, 518, 525, 307/526, 527; 328/109, 110; 340/825.51

[56] References Cited

U.S. PATENT DOCUMENTS

| | | | |
|---|---|---|---|
| 3,103,632 | 9/1963 | Kaiser, Jr. | 328/92 |
| 3,110,866 | 11/1963 | Maure et al. | 328/110 |
| 3,200,340 | 8/1965 | Dunne | 328/63 |
| 3,217,176 | 11/1965 | Chin | 328/110 |
| 3,327,226 | 6/1967 | Nourney | 328/109 |
| 3,673,429 | 6/1972 | Perry et al. | 328/110 |
| 3,912,942 | 10/1975 | Isham | 307/518 |
| 3,940,764 | 2/1976 | Beeswing | 307/234 |
| 4,027,262 | 5/1977 | Sharpe | 328/133 |
| 4,229,701 | 10/1980 | Bourner | 328/109 |
| 4,229,702 | 10/1980 | Thomas, Jr. | 328/110 |
| 4,369,408 | 1/1983 | Plohn et al. | 328/154 |
| 4,370,573 | 1/1983 | Keene | 307/514 |
| 4,398,105 | 8/1983 | Keller | 307/514 |
| 4,423,384 | 12/1983 | Debock | 340/825.51 |
| 4,757,217 | 7/1988 | Sawada et al. | 307/480 |
| 4,783,633 | 11/1988 | Woods | 328/110 |
| 4,894,565 | 1/1990 | Marquardt | 307/518 |

Primary Examiner—John S. Heyman
Attorney, Agent, or Firm—LaValle D. Ptak

[57] ABSTRACT

A two stage binary status register is set and reset by independent signals and comprises a first stage flip-flop, the output of which is connected to a second stage latch circuit. The set signals and the reset signals are applied to the two stages in a manner which insures that the output of the second stage latch always supplies an output corresponding to each set input signal, irrespective of the times of arrival of the set and reset signals, including all conditions of signal overlap and simultaneous arrival of both the set and reset signals.

8 Claims, 1 Drawing Sheet

STATUS REGISTER WITH ASYNCHRONOUS SET AND RESET SIGNALS

Background

Various applications exist for digital circuits which are responsive to two or more signals for providing outputs indicative of the occurrence of such signals. When the relative times of occurrence of the two different input signals are known in advance, such as for synchronized systems, it is a relatively simple matter to insure that the circuit receiving such signals provides output indications of the signal receipt. Problems exist however, for asynchronous systems or systems where the two different signals can occur simultaneously. For example, status registers which are set and reset independently by set and reset signals frequently require that if the set and reset signals occur simultaneously, the status register will not be reset without the set condition being recognized. Typically, status registers are set by a "write" signal and reset by a "read" signal.

In some known status registers, the read signal is used to generate a very narrow reset pulse at the end of the read signal. Two drawbacks result from this approach. First, a valid set or "write" signal can be lost if it occurs at the same time as the reset pulse. Secondly, the reset pulse typically is generated asynchronously by means of a one shot multi-vibrator, which makes this pulse very unpredictable and process dependent.

Systems have been developed to permit recognition of the receipt of simultaneously occuring input signals or for selecting a predesignated highest priority signal from two or more simultaneous signals. This latter type of system typically employs cascaded coincidence gates and bistable set/reset flip-flop circuits interconnected to insure the recognition of the designated highest priority signal any time simultaneous signals occur. At other times, lower priority signals may be recognized. When simultaneous signals including the priority signals are received, the lower priority signals in such a system are lost or ignored.

Systems also have been developed for indicating signal overlap between two input signals and for also providing an output signal indicative of which of two input signals occured first. In systems of this type, however, if two input signals simultaneously appear, one or the other of the potential output signals is produced as a result of a "race" condition of operation of the circuit. Consequently, one of the input signals is lost. If such a system is used in a status register, it would be possible to lose a "set" pulse. This is an unacceptable condition.

Other systems have been developed, including arrangements of interconnected gates and multiple bistable flip-flop circuits for recognizing each of two different input signals, irrespective of their times of occurrence, including when both signals occur simultaneously. Such systems typically require two separate input signals for each of the flip-flops. This results in substantial additional circuitry which occupies valuable space on the integrated circuit chip of which such a circuit is a part.

It is desirable to provide a status register circuit which can be written (set) and read (reset) by means of asynchronous signals in which the reset of the register occurs without ever losing a set signal, even if the two signals occur simultaneously or overlap.

SUMMARY OF THE INVENTION

It is an object of this invention to provide an improved signal processing circuit.

It is another object of this invention to provide an improved control circuit responsive to asynchronous input signals.

It is an additional object of this invention to provide an improved status register responsive to asychronous input signals which produces an output indicative of the receipt of one of those input signals irrespective of the times of occurrence of the different signals.

It is a further object of this invention to provide an improved system for eliminating ambiguous signals due to the simultaneous occurrence of multiple control signals.

In a preferred embodiment of this invention, a status register is responsive to asynchronous set and reset signals. The register provides an output indicative of each of the set signals irrespective of the relative times of occurrence of the set and reset signals. This is accomplished by supplying the set signals to a first bistable circuit which stores the set signals in response to the receipt of clock pulses applied to it. The output of this bistable circuit is supplied to a latch circuit, which is operated to pass the signals from the output of the bistable circuit to its output in one condition of operation and to block such passage of signals in a second condition of operation. The operating condition of the latch circuit is established by applying the reset signals from the second one of the asynchronous signal sources to a control input of the latch circuit. When no reset signals are present, the output of the latch circuit mirrors the output of the bistable circuit. Coincidence of the presence of a "set" output on the latch circuit and the presence of a reset signal is employed to reset the input bistable circuit, thereby preparing it for the receipt of the next "set" signal. This interrelationship of the presence of the reset signal and the output of the latch circuit insures that all of the "set" signals which are applied to the first bistable circuit are recognized on the output of the latch circuit irrespective of the relative times of occurrence of the set and reset signals.

DETAILED DESCRIPTION

Figure 1:
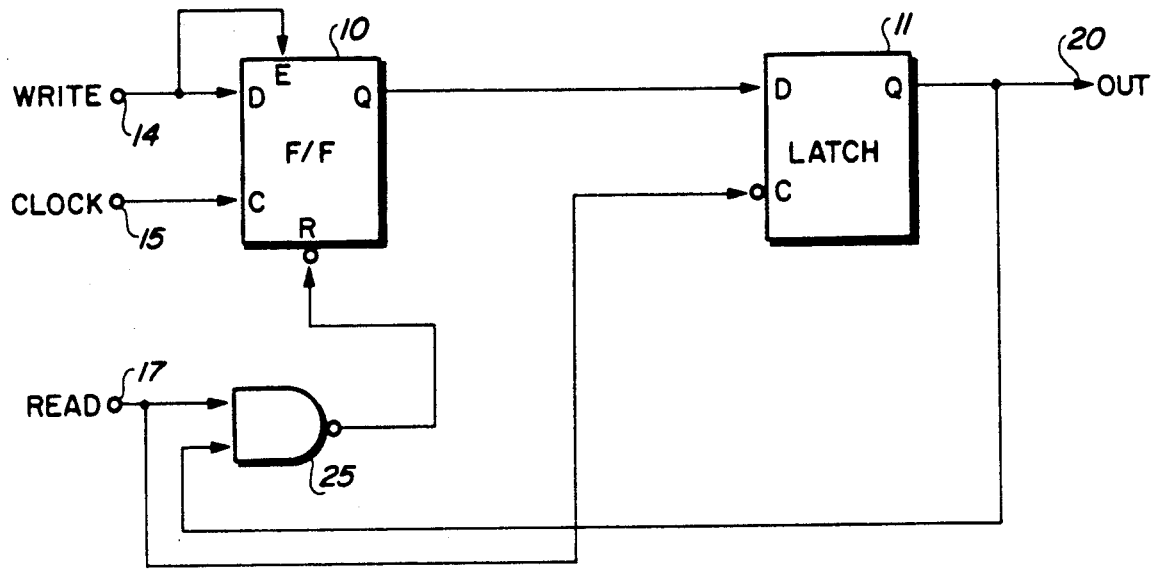
FIG. 1 is a schematic block diagram of a preferred embodiment of the invention.

The system shown in FIG. 1 is a status register which is set by "write" signals received on a terminal 14 and which is reset by "read" signals received on a terminal 17. These signals may be obtained from any suitable source within a larger system of which the circuit of FIG. 1 is a part. The signals appearing on the terminals 14 and 17, however, are asynchronous, that is they can overlap and they occur at various times with respect to one another. It is important for the circuit of FIG. 1 always to recognize the presence of each "write" signal appearing on the terminal 14. The "read" signals appearing on the terminal 17 are used to reset the circuit, but in the event there is an overlap between the signals on terminals 14 and 17, or if the two signals occur simultaneously, it is important always to provide an output signal on the output terminal 20 which is indicative of the presence of each one of the "write" signals applied to the terminal 14.

The circuit of FIG. 1 has been designed as a simple and effective status register which guarantees that if write (set) and read (reset) signals overlap or occur simultaneously, the register is not reset without the set or write condition being provided on the output. This is accomplished by a two-stage binary circuit. The first stage is a "load" clocked flip-flop 10, the output Q of which is supplied to the input of a bistable latch 11. The output Q of the latch 11 is connected to the output terminal 20. A control input C for the latch 11 is connected to the input 17 on which the read or reset pulses are provided.

The latch circuit 11 operates such that it is transparent to signals appearing on the output of the flip-flop 10, so long as no input pulse signal appear on the control input C. At any time the signal on the control input C is present or is "high", the latch 11 is blocked from changing the signal on its output. When the signal on the control input C of the latch 11 switches from "low" to "high", the latch 11 maintains the signal on its output which it had at the time the control input C switched to a "high" input. As soon as the signal on the control input C of the latch 11 once again goes "low", the latch 11 is released to pass whatever signal appears on its signal input D. As is readily apparent from an examination of FIG. 1, the read or reset signals appearing on the input terminal 17 directly control this operation of the latch circuit 11.

The input stage of the circuit of FIG. 1 comprises the "load" flip-flop 10, as described above. This flip-flop is triggered or operated by clock pulses (from a source not shown) appearing on a terminal 15 connected to the clock input C of the flip-flop. The flip-flop 10 is only triggered to produce a binary "1" or "high" output on its output terminal Q when the input signal applied to the terminal D, and simultaneously to an enable terminal E, is a binary "1" or "high". As illustrated in FIG. 1, these signals comprise the pulses applied to the terminal 14 and constitute the "write" or "set" input signals to the status register.

The circuit interconnections are completed by the provision of a NAND gate 25, the output of which is connected to the reset terminal R of the flip-flop 10. The flip-flop 10 is reset to force a "low" output signal on the output terminal Q whenever a "low" pulse is applied to the reset terminal R from the gate 25. Two inputs are provided to the NAND gate 25. One of these inputs is connected directly to the read signal input terminal 17 and the other is connected to the output Q or output terminal 20 of the latch circuit 11. Thus, a reset pulse for the flip-flop 10 is obtained whenever the output of the latch circuit 11 is a binary "1" or "high" at the same time a binary "1" or "high" input is applied to the read terminal 17.

Figure 2:
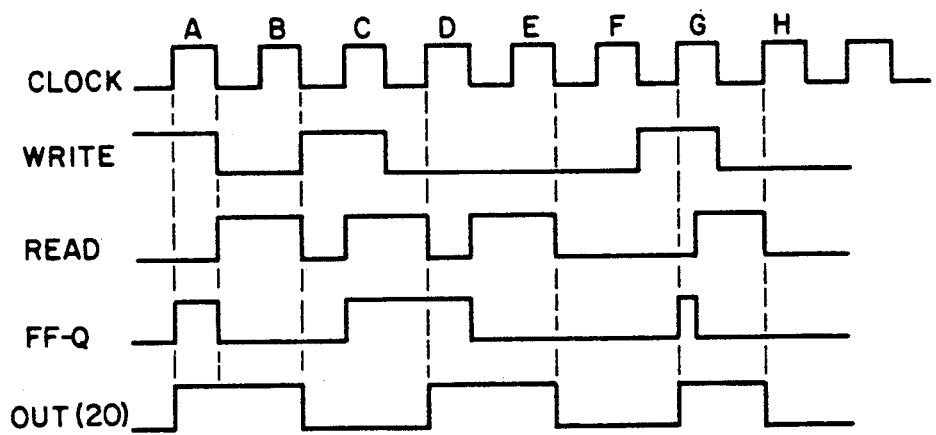
FIG. 2 is a timing diagram to illustrate the operation of the system of FIG. 1.

Reference now should be made to FIG. 2, in conjunction with FIG. 1, for an understanding of the manner in which the circuit of FIG. 1 operates under different sequences of occurrence of the signals applied to the terminals 14, 15, and 17. The clock signals applied to the terminal 15 are shown in the top waveform of the timing diagram FIG. 2 and are in the form of square wave clock pulses. These clock pulses are illustrated as having a 50% duty cycle, but obviously pulses of different duty cycles also can be employed if desired. Each of the different clock pulses shown in FIG. 2 are identified sequentially and alphabetically by the designations A through H. The clock pulses applied to the terminal 15, as illustrated in the top waveform of FIG. 2, may be obtained from any suitable source within the larger system of which the circuit of FIG. 1 is a part and typically are synchronized with other operations of such a larger system.

The write signals applied to the terminal 14 are shown in the waveform immediately below the clock pulses of FIG. 2, and the read signals applied to the terminal 17 are shown in the center of FIG. 2. Next, the output on the output terminal Q of the flip-flop 10 is illustrated, with the bottom line of FIG. 2 consituting the output signals on the terminal 20 from the latch circuit 11. The input signals applied to the two different inputs of the NAND gate 25 comprise the "read" signals and the "out (20)" signals of FIG. 2.

It should be noted that while the "write" and "read" waveforms, each are illustrated as being in the form of pulses having a length equal to one duty cycle of the clock signals on the top line of FIG. 2, the write and read pulses could have lengths other than the one shown. This length, however, has been selected as a convenient one for the purposes of illustrating the operation of the system. The relative occurrences of the write and read pulse signals shown in FIG. 2 have been selected to indicate different possibilities or combinations which can occur for these two signals in an asynchronous system.

As illustrated in FIG. 2, when the leading edge of the first clock pulse A occurs, a write pulse is present on the write terminal 14 and no read pulse is present on the terminal 17. In this condition of operation, the latch circuit 11 operates so that it is transparent to the signals appearing on the output terminal Q of the flip-flop 10. As described above, when a write signal is present on the terminal 14 at the time of occurrence of a clock signal on the terminal 15, the flip-flop is set to its "1" or "high" output state. This is illustrated in FIG. 2. Since the latch 11 is transparent at this time, the "high" or binary "1" output is provided on the terminal 20 from the Q output of the latch circuit 11.

As illustrated in FIG. 2, the write or set pulse on the input terminal 14 terminates or drops to a binary "0" at the end of the positive portion of the clock pulse A. The first read pulse then is illustrated as occuring. Since the output on the terminal 20 from the latch 11 is "high" or a binary "1" at this time, coincidence between this output and the "high" read pulse appearing on the terminal 17 enables the NAND gate 25 to apply a reset pulse to the reset input R of the flip-flop 10. This resets the flip-flop 10 to provide a binary "zero" on the Q output thereof. This does not change the output of the latch 11 at this time, however, since the high input from the "read" signal still appears on the terminal 17 which blocks the latch circuit 11 from changing its state.

At the time of occurrence of the second clock pulse B, no change in the state of the flip-flop 10 takes place, since the flip-flop is not enabled by a "high" signal on the write input terminal 14. The next write signal pulse is illustrated as occuring at the end of the second clock pulse B simultaneously with termination of the read input signal on the terminal 17. When this occurs, the latch 11 is released or becomes transparent to signals on the output of the flip-flop 10. Since the flip-flop 10 previously was reset to its binary "zero" condition, the output signal on the terminal 20 drops to a "low" or binary "zero" condition.

Upon the occurrence of the third clock pulse C, the flip-flop 10 once again is set to its binary "1" or "high" condition, since a write pulse is present on the terminal 14 at the time of occurrence of this pulse. At the same time, it should be noted that a read pulse appears on the terminal 17. This, however, has no affect on the operation of the flip-flop, since the gate 25 is disabled by the "low" output from the latch circuit 11. It also should be noted that the latch circuit 11 is prevented from changing its state because of the presence of the second read pulse. Upon termination of this second read pulse (illustrated as occuring simultaneously with the forth clock signal D in FIG. 2), the latch circuit 11 is released to once again attain the state of the flip-flop 10, which is a binary "1" or "high" at this time. Thus, the second "high" output in the bottom line of the timing diagram of FIG. 2 is produced corresponding to the second write pulse shown in FIG. 2.

When the third read pulse or signal occurs at the end of the clock pulse D, shown in FIG. 2, it coincides with the now "high" signal on the output terminal 20 to enable the NAND gate 25 to supply a reset pulse to the flipflop 10. Thus, the flip-flop 10 is reset back to its binary "zero" state, providing a "low" output to the input of the latch circuit 11. No change in the output of the latch circuit 11 occurs, however, until the "high" read signal on the terminal 17 terminates. Upon the termination of this third read signal, as shown in FIG. 2, the output on the terminal 20 from the latch 11 once again goes "low".

The third write pulse is shown occuring at the end of the timing pulse F and is present when the timing pulse G occurs. As explained previously, the timing pulse G causes the flip-flop 10 to be set to its "high" or binary "1" state. This is illustrated by the third relatively short "high" pulse in the FF-Q line of FIG. 2. Since the latch 11 is transparent at this time, this pulse immediately sets the latch 11 to a binary "1" or "high" output. Shortly after this setting of the latch 11, the fourth "read" pulse is applied to the terminal 17, as illustrated. This causes a coincidence of two "high" inputs on the NAND gate 25 which applies a reset pulse to the flip-flop 10, resetting that flip-flop back to its binary "zero" state. Once again, however, since the read pulse 17 continues to persist, this condition is not applied to the latch circuit 11 which, provides a strong or relatively broad binary "1" output indicative of the third write pulse which was received.

Various other combinations and relative times of occurrences of the write and read signals may be illustrated, but the result always is that the output on the terminal 20 always preserves all of the "1" or "high" write pulse signals applied to the input terminal 14, irrespective of the number of and time of occurrences of the read signals applied to the terminal 17. This is done without the necessity of providing one-shot multivibrators or other relatively unstable or unpredictable circuit components. In addition, a minimum number of components are utilized, which causes the circuit to be highly conservative of chip area in the integrated circuit system of which the circuit of FIG. 1 is a part.

Various changes and modifications will occur to those skilled in the art without departing from the true scope of the invention, as defined in the appended claims.

What is claimed is:

1. A status register responsive to asynchronous first (set) and second (reset) signals for providing an output indicative of each first signal irrespective of the relative times of occurance of the first and second signals, said register including in combination:

a first source of first signals;
a second source of second signals;
a source of clock signals;
first means coupled with said first source of signals to receive and temporarily store said first signals in response to clock signals from said source of clock signals, said first means having an output;
second means having an output and having an input coupled to the output of said first means and controlled by signals from said second source of signals to pass signals from the output of said first means to the output of said second means in the absence of signals from said second source of signals and blocking signals from said first source of signals from passing to the output of said second means in response to said second signals from said second source of signals; and
resetting means coupled with the output of said second means and with said second source of signals for resetting said first means to a predetermined operating state upon coincidence of a predetermined output of said second means and said second signals.

2. The combination according to claim 1 wherein said first means comprises a flip-flop means and said second means comprises a latch circuit means.

3. The combination according to claim 2 wherein said latch circuit means has a signal input coupled with the output of said flip-flop means and has a control input coupled with said second source of second signals.

4. The combination according to claim 3 wherein said flip-flop has a reset input and wherein said resetting means comprises a coincidence gate having first and second inputs and an output, the output thereof connected to the reset input of said flip-flop, with the first input thereof connected to the output of said latch circuit means and the second input thereof connected with said second source of said second signals.

5. The combination according to claim 2 wherein said flip-flop has a reset input and wherein said resetting means comprises a coincidence gate having first and second inputs and an output, the output thereof connected to the reset input of said flip-flop, with the first input thereof connected to the output of said latch circuit means and the second input thereof connected with said second source of said second signals.

6. A status register responsive to asynchronous first and second signals for providing an output indicative of each first signal irrespective of the relative times of occurance of the first and second signals, said register including in combination:

a first source of first signals;
a second source of second signals;
a source of clock signals;
bistable flip-flop means having an output and coupled to receive said first source of first signals and operated by clock signals from said source of clock signals for storing said first signals when clock signals occur simultaneously with the presence of first signals on the signal input thereto;
latch circuit means having a signal input coupled with the output of said flip-flop means, and having a control input and an output;
means coupling said second source of second signals with the control input of said latch circuit means, said latch circuit means operating to supply signals on the input thereof to the output thereof in the absence of said second signals on the control input thereof and to block passage of signals from the input thereof to the output thereof in the presence of said second signals on the control input thereof; and coincidence means coupled with the output of said latch circuit means and said second source of second signals for resetting said flip-flop means in response to coincidence of predetermined signals on the output of said latch circuit means and said second source of second signals.

7. The combination according to claim 6 wherein said flip-flop means has a reset input and said coincidence means comprises a two input coincidence gate means having an output connected to the reset input of said flip-flop means.

8. The combination according to claim 7 wherein said coincidence gate means comprises a NAND gate.

* * * * *